United States Patent

[11] 3,617,759

| [72] | Inventor | Kelsey Martin<br>Azle, Tex. |
|---|---|---|
| [21] | Appl. No. | 718,444 |
| [22] | Filed | Apr. 3, 1968 |
| [45] | Patented | Nov. 2, 1971 |
| [73] | Assignee | Martin Tracker Corporation<br>College Station, Tex. |

[54] ELECTROOPTICAL MEASURING SYSTEM
20 Claims, 5 Drawing Figs.

[52] U.S. Cl. .................................................. 250/234,
250/206, 250/220, 250/227, 250/237
[51] Int. Cl. ........................................................ H01j 3/14,
H01j 5/16, H01j 39/12
[50] Field of Search .......................................... 250/237 G,
232, 227, 219 R, 203, 220; 356/170

[56] References Cited
UNITED STATES PATENTS

| 2,766,387 | 10/1956 | Bolsey .......................... | 250/203 |
| 3,435,246 | 3/1969 | Webb ........................... | 250/237 |
| 3,448,274 | 6/1969 | Altman ......................... | 250/203 X |
| 2,948,890 | 8/1960 | Barth et al. .................... | 356/170 X |
| 2,977,843 | 4/1961 | Graeber et al. ................ | 250/204 |
| 3,106,706 | 10/1963 | Kolanowski et al. ........... | 250/227 X |
| 3,260,849 | 7/1966 | Polye ............................. | 250/227 X |
| 3,356,854 | 12/1967 | Humphrey ..................... | 250/227 X |
| 3,448,280 | 6/1969 | Blitchington, Jr. et al. .... | 250/227 |

OTHER REFERENCES

IBM Technical Disclosure Bulletin, Vol. 4, No. 7, Dec. 1961, " Optical Displacement Measuring Device," by J. J. Hamrick and B. E. Wendling, 250, 227

*Primary Examiner*—Roy Lake
*Assistant Examiner*—V. Lafranchi
*Attorney*—Michael P. Breston ABSTRACT: An optical tracker formed of a substantially light-tight housing having an optical system which focuses an image of an illuminated target on an image plane having four apertures which are symmetrically spaced on X- and Y-axes. A light pipe conveys the light entering each aperture to a photosensitive cell which has a linear and fast response. The cell provides an electrical signal proportional to the light received. The signals from a pair of cells are transmitted to a difference circuit for obtaining an electrical quantity proportional to the difference between the currents from the pair of cells. An amplifier provides a higher amplitude signal.

PATENTED NOV 2 1971 3,617,759

KELSEY MARTIN
INVENTOR.

BY Russell E. Schloss
ATTORNEYS

ELECTROOPTICAL MEASURING SYSTEM

This invention relates to measuring systems and more particularly to an optical tracker for measuring the displacement of an object from a reference axis without contacting such object.

The basic function of a optical tracker is to measure displacements of an object without making contact with the object. The displacements which are to be measured may be very small, may comprise small increments of some larger displacement which is taking place, or may comprise the very small changes, which occur from time to time, of the relatively large distance between two objects or between two points on the same object. In all these cases an optical tracker is essential if the object is remote, inaccessible or if its motion would be disturbed by attaching ordinary measuring devices, and especially if the displacements occur too rapidly or slowly for the human eye to follow.

For example, an optical tracker is essential to measure the settlement and vibrations of the foundation of a building under or near which tunneling operations are being conducted, to measure the feed, motion and chatter of a lathe tool, to measure the vertical displacement and vibration of the center of a bridge which spans a body of water, in order to observe effects of time, temperature, traffic and other conditions which result in vertical movements of the bridge. In other words, an optical tracker can be used in any case where it is necessary to measure the displacement of an object from a reference axis without being able to make contact with the object. The connection between the optical tracker and the object is made by a beam of light which introduces no appreciable disturbance to the object. Depending on its construction it may be used to measure movement from one reference axis or in several directions from two or more intersecting axes. Moreover, it will register correctly very rapidly or very slowly occurring displacements which cannot be properly measured by a human observer using visual instruments.

An optical tracker senses displacement and produces an electrical output signal which is linearly proportional to the displacement of the target. The output may be used to drive an oscilloscope or oscillograph and does not require the presence of an observer.

One known form of optical tracker locks onto a target which exhibits the property of having an optically emitting or reflecting area immediately adjacent to an absorbing area. Once the tracker is locked onto the interface between the two targets, subsequent motion of the target perpendicular to the interface is monitored by a scanning-type electronic image tube which produces through complex electronic circuitry an analog voltage which is proportional to displacement of the target. The tracker is very difficult to initially set up and adjust, delicate, expensive, easily disturbed magnetically, and lacks stability. While the prior art trackers will measure either horizontal or vertical movement they will not do so simultaneously.

Accordingly it is an object of the present invention to provide a novel optical tracker which is easy to set up and adjust, simple to operate, rugged, inexpensive to manufacture, reliable and stable and which does not require complex electronic circuitry.

It is another object to provide an optical tracker which will measure displacement along two axes continuously and simultaneously.

It is a still further object to provide an optical tracker which will measure a component of displacement along an axis while immune to displacements at right angles thereto.

It is still a further object to provide an optical tracker utilizing the electrical signals from photosensitive cells which are heat-insulated.

It is a further object to measure changes in the separation or distance between two targets.

In order to accomplish the above objects and other objects which will be apparent to those skilled in the art an optical tracker in accordance with the present invention is comprised of a substantially light-tight housing having an optical system which focuses an image of a target on an image plane in the housing. The image has finite dimensions in the directions of the displacements which are to be measured. An image-dissecting means accepts at least one pair of selected area portions of the light constituting the image. Each pair contains two opposite edges of the image. Displacement of the target in the measuring direction results in a linear variation in the amount of light contained in said area portions, increasing in one portion while decreasing in the other for any given displacement. Light-transmitting means conveys the accepted light to photosensitive cells which produce an electrical signal proportional to the conveyed light. Each pair of photosensitive cells is connected to a difference circuit which provides an electrical signal algebraically proportional to displacement of the target in its respective direction.

Figure 1:
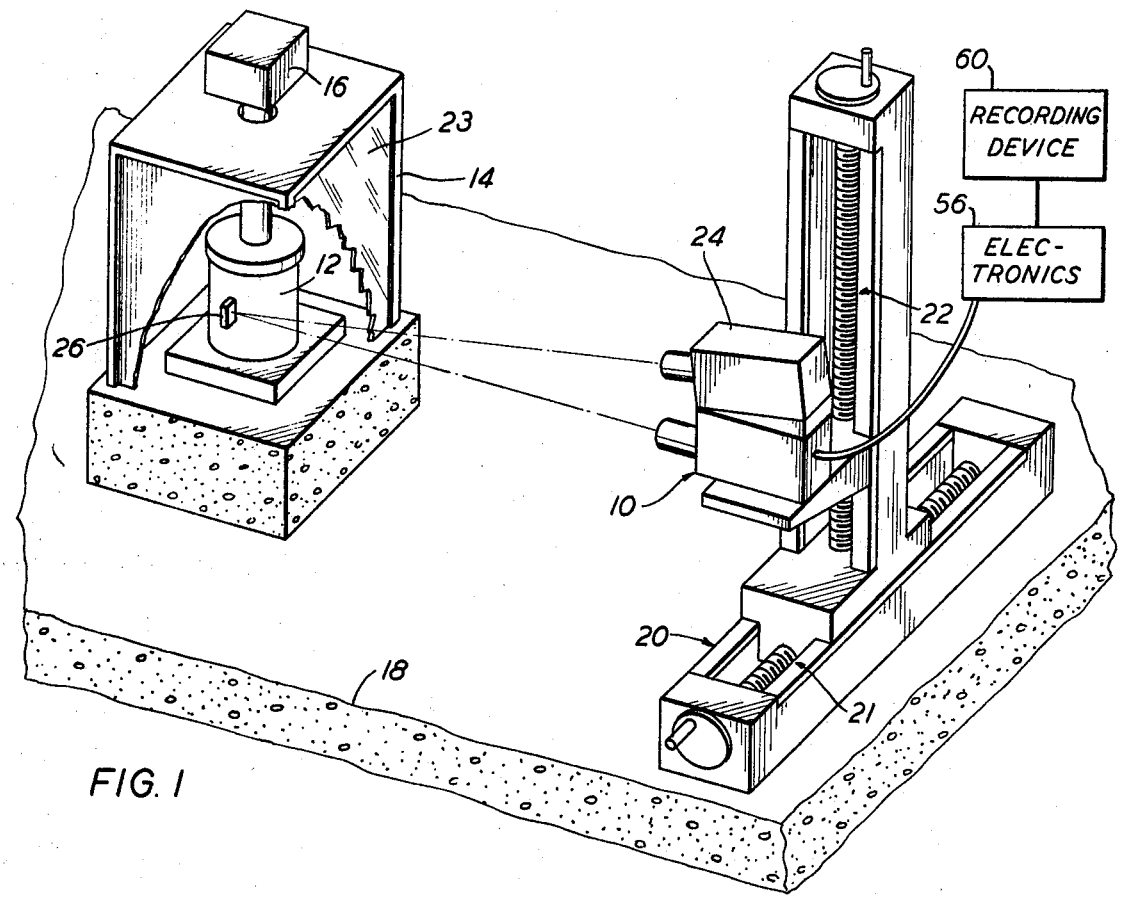
FIG. 1 is a diagrammatic view illustrating the displacement of a compacted soil specimen being tracked by an optical tracker constructed in accordance with the present invention.

Referring now to the drawings and in particular to FIG. 1, where it can be seen that an optical tracker 10 is being utilized to measure the settlement and pseudoelastic deflections of a compacted soil specimen 12 located inside a water-filled pressure vessel 14, subjected to repetitive vertical transient loads by load-applying means 16 over a period of several days, each repetition of the transient load lasting for one-tenth of a second and repeated at two-second intervals. It can be appreciated that such settlement and rapidly occurring pseudoelastic deflections could not be accurately measured by ordinary visual instruments.

The pressure vessel is mounted on a firm concrete foundation 18. The tracker is mounted on a rigid stand 20 which is likewise mounted on the concrete foundation. The stand has vertical and horizontal micrometer adjusting screws 21 and 22 so that the position of tracker 10 can be accurately ascertained. Pressure vessel 14 is provided with a window 23 through which the object can be viewed. A light source 24 illuminates the surface of the specimen.

In order to measure the settlement and pseudoelastic displacements, a point on the surface of the specimen was selected and a target 26 attached to the specimen. Target 26 is formed of a square 0.3 inch by 0.3 inch of white reflective material. It is desirable to have an area of contrasting color surrounding the target in order to provide a light-dark interface. Although it has been found that an illuminated white square target is very effective, other sizes and shapes of targets may be used. For example, a dark center surrounded by a contrasting color would be suitable. Also an unilluminated object in front of an illuminated background will suffice. Moreover, a circular target may be used in place of square target 26.

Figure 2:
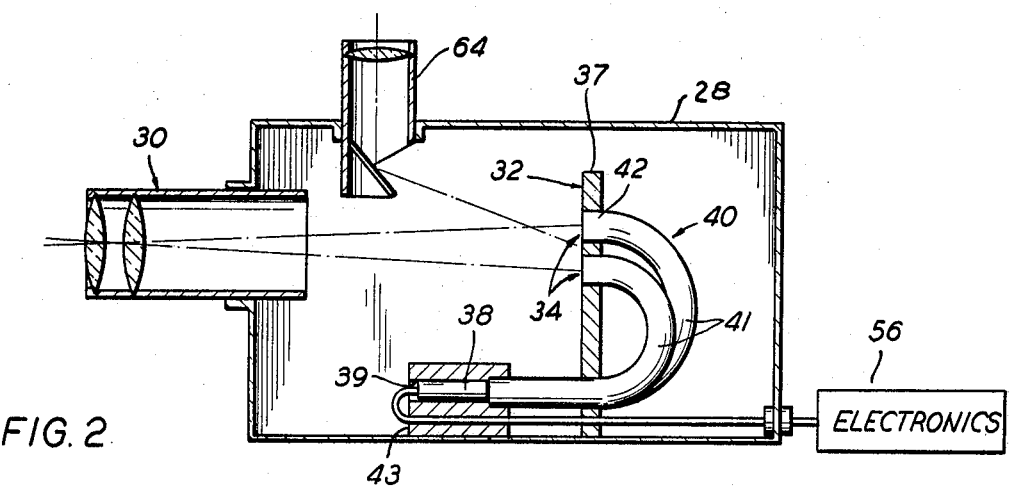
FIG. 2 is a vertical cross-sectional view of the tracker shown in FIG. 1.
Figure 3:
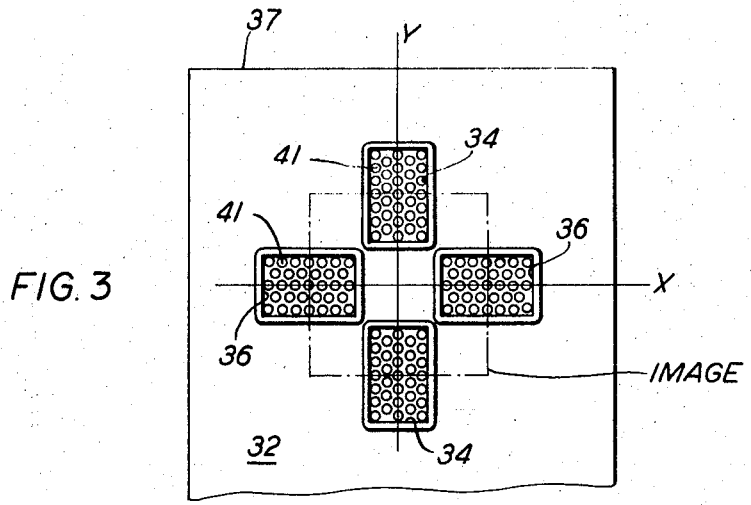
FIG. 3 is a section view taken along lines 3—3 of FIG. 2.
Figure 4:
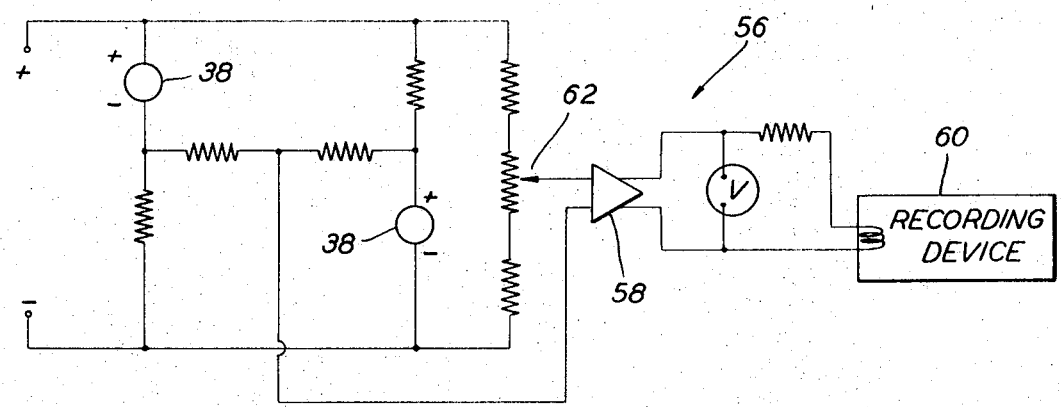
FIG. 4 is a schematic diagram of the electric circuitry for one channel of the tracker.
Figure 5:
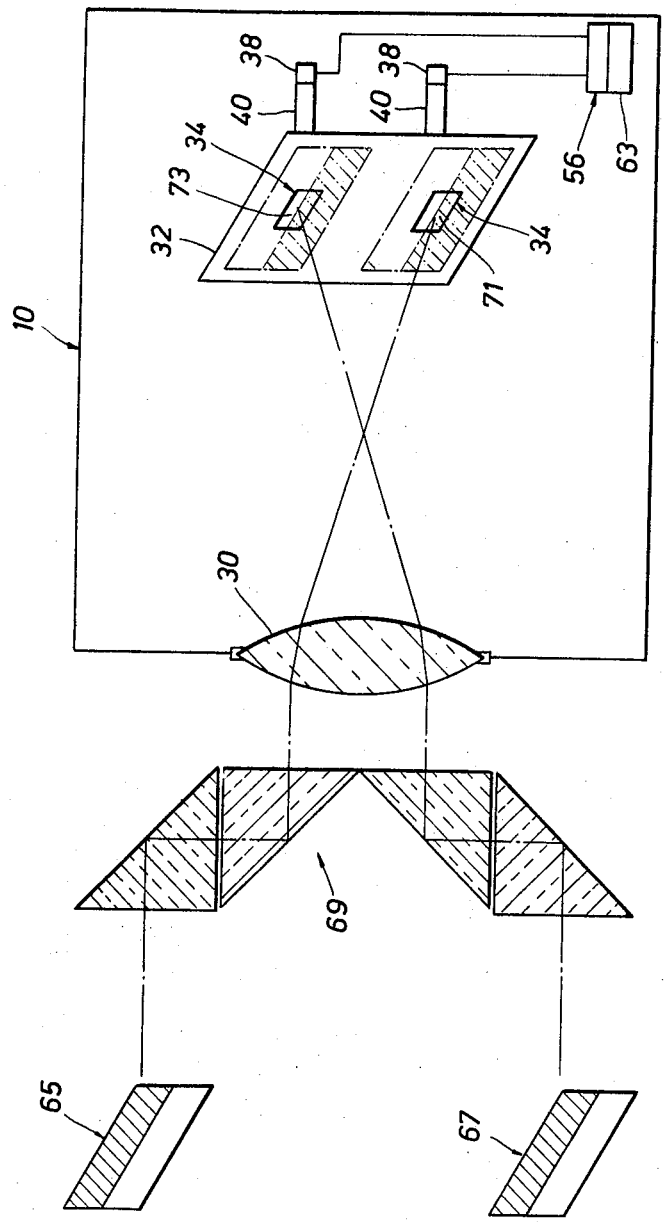
FIG. 5 is a diagrammatic view illustrating two targets and a single tracker.

As shown in FIG. 2, the optical tracker is formed of a substantially light-tight housing 28 having an optical system 30 formed of a set of lenses capable of focusing an image of target 26 on a flat plate 37, one surface of which forms an image plane 32 which is perpendicular to the central axis of the optical system 30. Located in plate 37 are a pair of vertically spaced apertures 34—34 and a pair of horizontally spaced apertures 36—36. As can be seen in FIG. 3, the apertures are identical and are spaced symmetrically about the intersection of an X-axis with a Y-axis, which is coaxial with the central axis of optical system 30. Although it is convenient to utilize identical square or rectangular apertures, it is not essential that they be of such shape so long as light entering each aperture will increase or decrease as the image moves, and that the increase or decrease of the difference between the amounts of light entering each aperture of a pair will be precisely linear with respect to such motion.

Photoelectric cells 38, one for each aperture, are utilized to measure the light entering each aperture. To conduct the light from the apertures to the photoelectric cells a suitable light-transmitting means 40 couples each aperture with its photoelectric cell. The connection between the light-transmitting means and the photoelectric cells should be such that no light other than that being conveyed from the apertures reaches the photoelectric cells. It has been found that light pipes make excellent light-transmitting means since they randomize the light so that the light entering a particular area of the light pipe at the aperture emerges from the opposite end of the light pipe in a randomly distributed manner and therefore tends to be distributed over all of the sensitive area of the photoelectric cell. Moreover, light pipes are very poor conductors of heat and therefore heat at the image plane is not transmitted to the photoelectric cells. The light pipes may be formed of fiber optic tubes having randomized fibers. In some instances, it may be possible to couple the photoelectric cells directly to the apertures. In such case, it is necessary that each photoelectric cell be of precisely uniform sensitivity throughout all utilized portions of its light-sensitive area.

As can be seen in FIG. 2 there is a vertical member 37 the front surface of which lies in image plane 32. Located in member 37 are openings forming the apertures. The light pipes are randomized optical fiber tubes 41. The front end 42 of each tube is formed into rectangular shape, and positioned in the opening with the front surface lying in the image plane. The other end of each light pipe 41 is in communication with its photosensitive cell. The photosensitive cells are mounted in spaced side-by-side cavities 39 in a common assembly 43. Accordingly the light entering the apertures is conveyed from the image plan to the photosensitive cells in a randomized manner. Moreover the photosensitive cells are shielded from all other light. Therefore, each photosensitive cell receives the amount of light admitted by the aperture to which it is connected by its light-transmitting means.

The photoelectric cells 38 provide an electrical output which is precisely proportional to the amount of light incident upon them. Also, they have the ability to respond to extremely rapidly occurring changes of the amount of incident light. It has been found that Texas Instruments, Inc. Photoelectric cell type LS 400 provides excellent results. Inasmuch as photoelectric cells tend to be somewhat affected by temperature changes, it is desirable that all of the photoelectric cells 38 be maintained at the same temperature. It has been found that mounting all of the photoelectric cells in common assembly 43 accomplishes this purpose.

Each pair of photoelectric cells is connected to a difference circuit 56 containing an amplifier 58 which provides a magnified replica of resulting difference current as well as a voltage proportional thereto. This output may be used to operate a recording device 60 which may be an oscilloscope or oscillograph.

In initially setting up the device the image of target 26 is focused by optical system 30 on image plane 32 in such a manner that the image of the target is centered about the intersection of the X- and Y-axes and therefore an equal amount of light enters each of the apertures. The light entering each aperture is separately conducted by the light-transmitting means to its respective photoelectric cell. In order to avoid the requirement that each photoelectric cell be of absolutely equal efficiency of response, balancing circuit means 62 are provided to equalize the effective current under the centralized condition so that the net input current to amplifier 58 in the centralized condition of the image is zero.

As previously mentioned in the initial setting the center of the image of target 26 is centered on the image plane. However, it is not necessary that a sharp image be formed. It has been found that a slight defocusing of the image is sometimes helpful in achieving uniformity of the intensity of the image.

As mentioned in reference to the setup in FIG. 1, the target was 0.3 inches square. The rectangular apertures in image plane 32 of optical tracker 10 were 0.18 inch high by 0.1 inch wide and spaced by 0.36 inch, center to center vertically. The desired image to be focused on the image plane is a square of light 0.36 inch by 0.36 inch. Accordingly, the lens to aperture distance must therefore be made 1.2 times as large as the lens to target distance in order to magnify the image to the desired size. The required focal length for the lens in optical system 30 depends upon how far from the target it must be placed and upon the distance from the lens to the image plane. Since various applications require different sizes of targets while the device is most conveniently constructed for only one size image, a series of interchangeable lenses of various focal lengths may be provided and the image plane to lens distance may be made adjustable so that the same size image may also be produced by the optical system.

In accordance with the familiar lens formulae $$\frac{1}{\text{Focal length}} = \frac{1}{\text{Object Distance}} + \frac{1}{\text{Image Distance}}$$

$$\text{Magnification} = \frac{\text{Image Distance}}{\text{Object Distance}}$$

Using a lens having a focal length of 10.5 centimeters the 0.3-inch square target will produce a 0.36-inch square image by placing the target 19.25 cm. in front of the lens and placing the image plane 23.1 cm. behind the lens. With such a setup the device will measure displacements limited to slightly less than 0.09 inch either way from center. When equipped with suitable lens and utilizing a smaller target smaller ranges will be accommodated. On the other hand, utilizing a telephoto lens and relatively large targets, displacements corresponding to a small fraction of the dimensions of the target can be accurately ascertained at great distances from the object.

As mentioned, in the initial setup the image of target 26 is centered in image plane 32. Accordingly all four apertures receive equal portions of the light produced by the image and the four photoelectric cells should produce equal currents. In the event of inequality each pair may be equalized by balancing circuit 62 so that the difference signal produced by each amplifier is zero.

Any vertical displacement upward or downward will produce an electrical output signal having a magnitude strictly proportional to the magnitude of the displacement and having a polarity representative of the sense of the displacement. Inasmuch as the difference circuit subtracts to produce a zero signal when the image occupies the central position indication of this reference position is completely unaffected by any variations which may occur in the intensity of the image, such as might be caused by a change in the brightness of target illumination. The only consequence of diminished image intensity is that of proportionally diminished sensitivity to displacement away from the central reference position. Accordingly, optical tracker 10 requires only normal stability of light source 24 and therefore the light source may if desired be operated directly from available power rather than having a regulated power supply.

While optical tracker 10 has four apertures and two independent channels, one for vertical displacement and one for horizontal displacement, thereby permitting the simultaneous observation of displacement along both axes, thus resolving all planar motion of the target regardless of which direction it moves, in many applications only one channel is necessary. In such cases it is possible to construct the device with only one channel which may be so mounted that it can be used for either direction by rotation of the apertures or to just use one single channel of a dual-channel instrument.

If only displacement in one direction is desired it is only necessary to use one channel. For example, if only vertical displacement is desired, it is only necessary for the target to have a shape symmetrical about a horizontal axis in order to permit vertical displacements to be observed. Furthermore, since the difference between the amount of light entering one aperture and the amount of light entering the other aperture, rather than the absolute amounts, produces the signal, it is not necessary that these amounts vary linearly with displacement of the image. It is merely necessary that the difference vary linearly. Consequently a host of shapes for both target and aperture are possible which satisfy this requirement. For example, a square, turned so that one of its diagonals is vertical, can be used for the target and apertures. As the image is successively displaced by equal increments of distance vertically, the portion of the area of each aperture on which light falls will vary in accordance with the square law. However, the difference in the two varies linearly.

Nevertheless, it is preferred to employ target and aperture shapes which provide linear behavior at each individual aperture; then the overall linearity of the difference may be expected to have minimum possibility for error. All that is required is that the apertures be parallel-sided in the general direction of the displacement axis cooperating with a target having a central figure which is parallel-sided in a direction more or less perpendicular to the displacement axis.

As mentioned, optical tracker 10 may be used to measure the displacement between two objects or between two points on the same object: a device to perform such service is generally known as an extensometer. For such service two trackers may be used. One tracker is focused on one target and the second tracker focused on the second target. The output from such trackers may then be connected in series opposition to obtain the relative displacement. It is also feasible to just use the output from one photosensitive cell of each tracker. In such case the output from the single photosensitive cell from each tracker is fed into the difference circuit 63. Furthermore, the targets 65, 67 may be arranged, together with suitable prisms 69, in front of the optical system 30 of the tracker 10 so that the light-dark interface image 71 of one target 65 is focused on one aperture of the pair while the similar interface image 73, of the second target 67 is focused on the other aperture of the pair.

In order to set up and calibrate the tracker, that is, to determine the electrical output signal obtained for a specific amount of displacement, the tracker is set on stand 20 and the optical system adjusted so that the target image is centered on the image plane. It is preferable in the center position that the target image more or less splits the distance between the apertures. To accomplish this the housing may be provided with an optical viewer 64. The horizontal and vertical adjusting screws 21 and 22 can be utilized to obtain the central position. In such case the output from difference circuit 56 should be zero. If it is not zero balance circuit 62 may be adjusted to obtain zero.

Regardless of the relative size of the target and image, displacement of the target in the measuring plane or displacement of the tracker in a plane parallel thereto produce equal effects. For example, if a vertical displacement of the 0.3-inch target in FIG. 1 of 0.05 inch produces a change in electrical output of 1 volt, a vertical displacement of the entire tracker (such as by movement of micrometer screw 22) will also produce a change in electrical output of 1 volt. Accordingly, it is not necessary to move the target in order to calibrate. It is only necessary to move the tracker a known distance. As a further consequence of the system being linear one such known displacement along each axis will suffice.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An optical tracker for measuring the displacement of a target in the plane of the target in at least one direction, said tracker comprising: a housing having a plate, one surface being an image plane and an optical system for focusing an image of the target on the image plane, said image having finite dimensions in the direction in which displacement is to be measured, image-dissecting means for accepting at least one pair of selected portions of the light constituting the image, said portions each including an opposite edge of the image, each image-dissecting means shaped to cooperate with the shape of the edge of the image such that the difference between the amounts of light accepted by a pair of image-dissecting means varies linearly with the amount of displacement of the target in the direction in which displacement is to be measured, and such that said difference is substantially independent of target displacement in any direction generally normal to said direction, photosensitive means for receiving each portion of light from each image-dissecting means and producing therefrom an electrical signal linearly proportional to the amount of light in each said portion, said photosensitive means coupled to said image-dissecting means such that equal amounts of light within any elementary part of said accepted portions will produce an equal elementary increment of electrical signal, a difference circuit receiving the electrical signals from a pair of the photosensitive means and producing therefrom a signal which is linearly proportional to the displacement of the target, and signal output means receiving the signals from the difference circuit and continuously responding to the displacement of the target.

2. The optical tracker specified in claim 1 in which each image-dissecting means has parallel sides extending generally in the direction in which displacement is to be measured, and the width of the image is such that movement in any direction generally normal to movement in the direction to be measured does not materially change the light accepted by the image-dissecting means.

3. The optical tracker specified in claim 2 in which the width of the image is greater than the distance between the parallel sides.

4. The optical tracker specified in claim 1 including light-transmitting means for coupling the photosensitive means with the image-dissecting means, said light-transmitting means randomizing the light received from the image-dissecting means and distributing it in a random fashion over the sensitive area of the photosensitive means.

5. The optical tracker specified in claim 4 wherein the light-transmitting means are light pipes formed of a plurality optical fibers in which the relative positions of the individual fibers at the emitting end are randomized with respect to the relative positions of the same fibers at the receiving end.

6. The optical tracker specified in claim 1 wherein the difference circuit includes balancing means for compensating inequalities among the photosensitive means.

7. The optical tracker specified in claim 1 wherein the tracker measures displacement of a target in two substantially orthogonal directions in the plane of the target including an image-dissecting means for accepting two pairs of selected portions of the light constituting the image and two pairs of photosensitive means.

8. The optical tracker specified in claim 1 wherein there are two targets with an initial separation between them and displacement to be measured is represented by increases and decreases in said separation.

9. The optical tracker specified in claim 1 wherein said image-dissecting means is formed by a first pair of apertures in said plate.

10. The optical tracker specified in claim 9 wherein said image-dissecting means includes a second pair of apertures, said apertures being symmetrically spaced about an X-Y axis, the intersection of which is coaxial with the optical axis of said optical system; and further including two pairs of photosensitive means and two difference circuits, one difference circuit receiving the linear electrical signals from one pair of photosensitive means and the other difference circuit receiving the linear electrical signals from the other pair of photosensitive means.

11. The optical tracker specified in claim 9 wherein the light-transmitting means are light pipes which diffuse the light transmitted.

12. The optical tracker specified in claim 9 wherein the light-transmitting means are light pipes formed of randomized optical fibers.

13. The optical tracker specified in claim 1 wherein the photosensitive means are mounted in a common assembly.

14. An electro-optical measuring system for measuring the movement of an object comprising: a target attached to the object whose movement is to be measured, said target having at least one pair of generally parallel light-dark interfaces between regions having different uniform illumination intensities, a plate distant from the target with one surface thereof being an image plane, an optical system between the target and the image plane for focusing an image of the target on the image plane, said image having finite dimensions in the direction of the movement to be measured, at least one pair of image-dissecting means located approximate the image plane, each image-dissecting means accepting a portion of said image containing at least one light-dark interface of the image, each image-dissecting means shaped to cooperate with the shape of the light-dark interface such that movement of the target in any direction generally normal to the direction of the movement to be measured does not materially change the amount of the image accepted by the image-dissecting means, and such that said pair of portions of the image accepted by the image-dissecting means contain amounts of light whose difference varies linearly with the movement of the target in the direction of the movement to be measured but is substantially independent of target movement in any direction generally normal thereto, a linear signal producing means coupled to each image-dissecting means such that equal amounts of light within any elementary part of said accepted portions will produce an equal increment of electrical signal thereby producing an electrical signal linearly proportional to the amount of light received by said signal-producing means and signal output means continuously responding to the movement of the target.

15. The electro-optical measuring system set forth in claim 14 wherein the image-dissecting means includes substantially parallel sides extending generally in the direction to be measured and the width of the image is such that movement in any direction generally normal to movement in the direction to be measured does not materially change the light accepted by the image-dissecting means.

16. The electro-optical measuring system set forth in claim 15 wherein the width of said image is substantially greater than the distance between the parallel sides of said image-dissecting means.

17. An optical tracker for measuring the displacement in at least one direction of a target having a light-dark interface in the plane of the target, said tracker comprising: a member, one surface being an image plane, an optical system for focusing an image of the target on the image plane, said image formed of two regions having different uniformly illuminated areas separated by a light-dark interface, image-dissecting means located approximate the image plane, the image-dissecting means accepting a selected portion of the light constituting the image including the light-dark interface, the image-dissecting means shaped to cooperate with the shape of said interface such that displacement of the target in any direction generally normal to the direction of the movement to be measured does not materially change the amount of the image accepted by the image-dissecting means and such that the portion of light accepted by the image-dissecting means varies linearly with the displacement of the target in the direction of the displacement to be measured and is maintained substantially independent of target displacement in direction generally normal thereto, and linear signal producing means coupled to the image-dissecting means for receiving the light from the image-dissecting means such that equal amounts of light within any elementary part of said accepted portions will produce an equal elementary increment of electrical signal thereby producing an electrical signal linearly proportional to the amount of light from said image-dissecting means, and signal output means continuously responding to the displacement of the target.

18. The method of continuously monitoring the displacement of an object in at least one direction comprising:
illuminating at least a portion of the object to establish at least one light-dark interface between regions having different uniform illumination intensities;
forming with an optical system an image of at least a portion of the illuminated portion of the object in a plane remote from the object, said image containing at least two adjacent areas having different uniform illumination intensities separated by the light-dark interface;
aiming said optical system such that a portion of the image containing the light-dark interface falls across a light-admitting aperture located approximate the image plane, said aperture being small compared with the image and shaped to cooperate with the edge of said light-dark interface such that the amount of light admitted varies linearly with the amount of displacement of the image in the direction of the displacement to be measured and is substantially independent of object displacement in any direction generally normal thereto;
collecting a fixed fraction of the admitted light;
distributing said collected light over a substantial portion of a photosensitive device, said device having a linear relationship between its electrical output and the amount of incident light thereby producing an electrical output signal linearly proportional to displacement of the image in the direction to be measured; and
applying said electrical output signal to a signal output means which continuously responds to displacement of the object.

19. The method of claim 18 in which the output signal is restored to a previous value by displacing the optical system and then measuring the amount of displacement.

20. A method of monitoring a position of an object, said object controlling the position of an interface between two distinct light levels, said method comprising:
focusing an optical image of at least a portion of said interface onto a plane containing a light-accepting area, said image being continuously incident upon said area, and
converting the light incident upon said area into a continuous electrical signal to linearly proportional to the position of said object.

* * * * *